United States Patent Office 3,516,743
Patented June 23, 1970

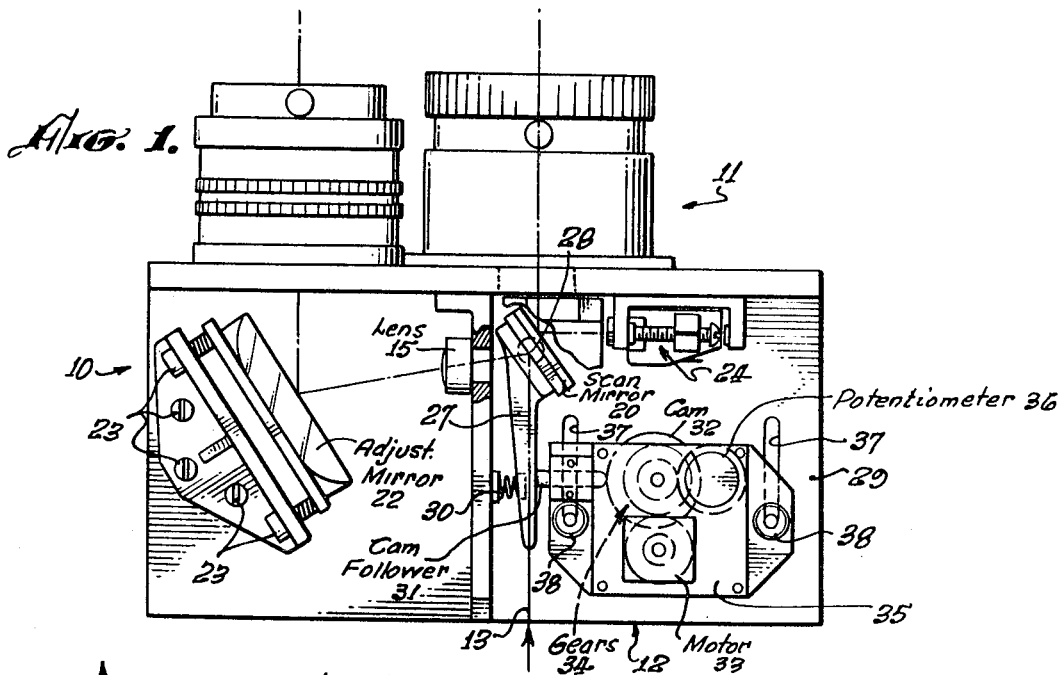
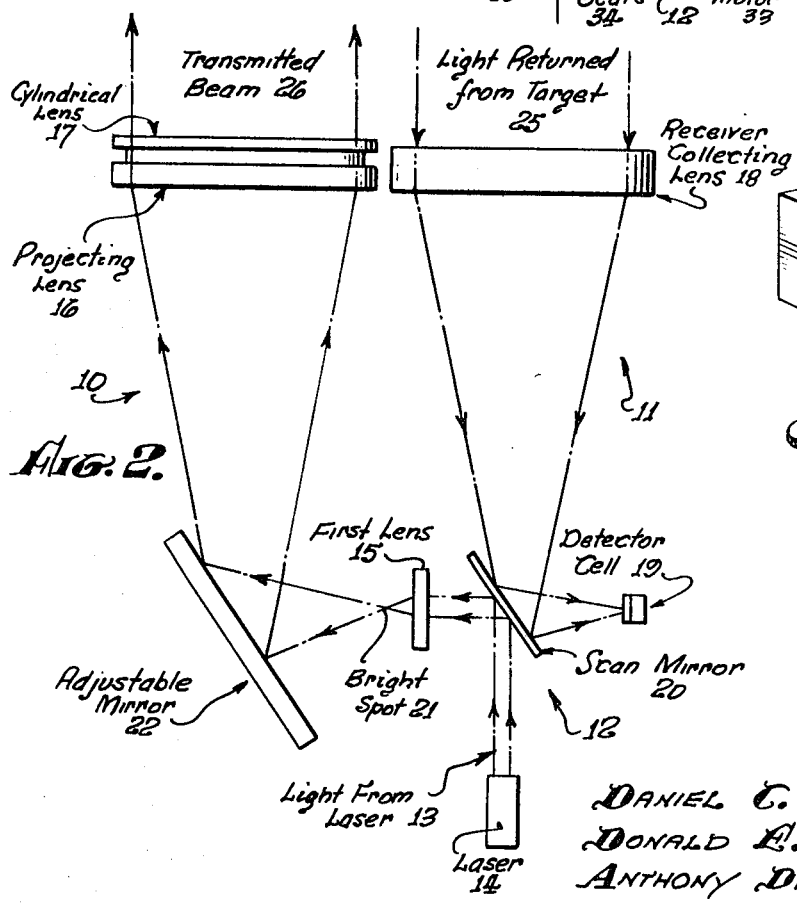

---

3,516,743
LASER RADAR SYSTEM
Daniel C. McKown, Chino, Donald E. Howlett, Riverside, and Anthony Di Tommaso, Upland, Calif., assignors to General Dynamics Corporation, Pomona, Calif., a corporation of Delaware
Filed Sept. 10, 1965, Ser. No. 486,507
Int. Cl. G01c 3/08
U.S. Cl. 356—4
12 Claims

ABSTRACT OF THE DISCLOSURE

A compact optical system which changes the transmitted output of a laser unit into a slender rectangular beam which is scanned back and forth at right angles to the length of the rectangle while, simultaneously, the field of view of associated receiver optics is scanned across a detector unit in synchronism with the scanning motion of the transmitted beam.

---

Optical systems for tracking of laser-illuminated targets are known in the art. Such systems include optical transmitter and receiver combinations for transmitting energy and receiving echoes reflected back from target objects. In most of the known systems the transmitter and receiver are made separately and are used at spaced positions so that the transmitted signal is reflected back through some angle from a target object to a receiver. Such devices present problems of accurately directing each transmitter and receiver for target object picked up and of coordinating the transmitter and receiver relation for object tracking.

Composite optical transmitter and receiver devices have been developed that utilize annular transmitter and receiver reflectors so that the signals are transmitted and received concentrically or coaxially to and from a target object.

The present invention utilizes optical transmitter and receiver devices which move in unison and function to transform the output of a laser crystal into a beam whose cross section is a slender rectangle, and to scan the rectangular beam back and forth in a direction at right angles to the length of the rectangle while simultaneously scanning the receiver field of view across detector cells or an eyepiece in synchronism with the scanning motion of the transmitter fan beam.

Therefore, it is an object of this invention to provide an optical system.

A further object of the invention is to provide an optical system having synchronized transmitting and receiving optics.

Another object of the invention is to provide an optical system for a laser radar.

Another object of the invention is to provide an optical system for a laser radar where the transmitting and receiving optics are inter-related through a scanning mechanism which causes the receiver to be always looking at whatever objects the transmitter is illuminating.

Another object of the invention is to provide an optical system which transforms the output of a laser crystal into a beam whose cross section is a slender rectangle, and to scan the rectangular beam back and forth in a direction at right angles to the length of the rectangle while simultaneously scanning the receiver field of view across a detector unit in synchronism with the scanning motion of the transmitter fan beam.

Other objects of the invention, not specifically set forth above, will become readily apparent from the following description and accompanying drawing wherein:

FIG. 1 is a plan view of an embodiment of a transmitter-receiver unit utilizing the optical system of the invention;

FIG. 2 is a schematic illustration of the inventive optical system; and

FIG. 3 is a perspective view of the drive assembly for the optical system.

Broadly, the invention, as illustrated, relates to an optical searching device comprising a laser, a transmitting channel, a receiving channel and detecting means. Alignment of the transmitter and receiver in the searching mode is accomplished by the use of a two sided scan mirror, alternate sides of the mirror cooperating on the one hand with the laser beam to scan a given area, and on the other with detector cells to align their field of view with the beam. Specifically, the system comprises transmitting optics including a first lens and an adjustable mirror which deflects the laser output to beam shaping optics comprising a projecting lens and a cylindrical lens. In the receiver a single collecting lens is interposed between the scan mirror and the reflected energy. A synchronized drive assembly is utilized to operate the scan mirror.

Referring now to the drawings, the device illustrated is the optical system of a laser radar. The optical system consists of two main parts, the transmitting optics indicated generally at 10 and the receiving optics indicated generally at 11. These two parts are interlocked through the scanning mechanism indicated generally at 12, which causes the receiver 11 to be always looking at whatever objects the transmitter 10 is illuminating.

The transmitting optics 10 receives the output or beam 13 of a laser crystal indicated at 14, which is a beam of circular cross section, and forms it into a beam of rectangular cross section. In the process of transforming the beam 13, the transmitting optics 10 reduces the beam divergence in one dimension and increases its divergence in the other dimension. This is done in two stages. A collimator comprising a first lens 15 and a projecting lens 16 is used to reduce the beam divergence in both dimensions and then a cylindrical lens 17 is used to increase the divergence in one dimension.

The receiving optics includes a lens 18 which images the target complex onto the detector cell or cells 19. The target is regarded as being at infinity because its distance from the receiver collecting lens 18 is many times the focal length of the receiving optics 11. Scanning is accomplished by the use of a single two-sided plane mirror 20 oscillated by the mechanism shown in FIGS. 1 and 3. The light to be transmitted is reflected from one side of the mirror 20, and the received light is reflected from the other side. Because both reflecting surfaces are deposited on the same substrate, any rotation of the substrate will be faithfully converted into a proportional rotation of both the transmitted beam and the receiver field of view.

As shown in FIG. 2, the beam 13 of light from a laser 14 is first reflected by the scan mirror 20 onto the first lens 15 of the collimator which focuses the beam into a bright spot indicated at 21. Because of the oscillating motion of the scan mirror 20, the focal point or bright spot 21 moves back and forth, thereby providing the basis for the scanning motion of the transmitted beam, this being accomplished by the drive assembly illustrated in FIGS. 1 and 3 described in detail hereinafter. After passing through the focal point or bright spot 21, the rays diverge as they move toward a projecting lens 16 via an adjustable mirror 22. After passing through the projecting lens 16, the rays are nearly parallel. The divergence of this nearly parallel beam is related to the divergence of the original beam 13 from the laser 14 as follows:

$$f_1 \theta = f_p \phi$$

where:

$f_1$=focal length of the first lens 15
$f_p$=focal length of the projecting lens 16
$\theta$=divergence of the laser 14 output
$\phi$=divergence of output from projecting lens 16

Because the ratio of $f_p$ to $f_1$ would typically be 5 to 1, the output beam divergence is only one fifth the divergence of the input laser beam. This output beam divergence is satisfactory for the narrow dimension of the rectangular beam cross section, but the divergence is not great enough for the longer dimension of the beam.

To broaden the beam in the long dimension, the diverging (negative) cylindrical lens 17 is inserted into the optical path following the projecting lens 16. The resulting long dimension of the beam is:

$$\phi + 2 \text{ arc ctn} \frac{2fc}{d}$$

where:

$\phi$=divergence of output from projecting lens 16
$fc$=focal length of cylindrical lens 17
$d$=diameter of the bundle of rays falling on the cylindrical lens 17

The adjustable mirror 22 is used in the transmitted beam path between the first lens 15 and the projecting lens 16 to change the direction of the rays and to provide an adjustable capability which is accomplished via adjustment screws indicated at 23 in FIG. 1.

The receiving optics 11 consists of the receiver collecting lens 18 and the scan mirror 20. The receiver collecting lens 18 focuses the rays toward the detector cell or cells 19 which is adjustably mounted by the mechanism indicated at 24 in FIG. 1, the cell being omitted in FIG. 1 for clarity. Along the optical path between the receiver collecting lens 18 and the detector cell or cells, the rays are reflected by the scan mirror 20 which changes their direction and imposes a scanning motion on the image formed at the detector cell 19 which lies in the image plane of the receiver collecting lens 18. This scanning motion is provided through the drive assembly illustrated in FIGS. 1 and 3 and described hereinbelow.

The detector cell 19 remains motionless. It is desired that the detector cell 19 always receives the radiation indicated at 25 returned from the spot or target illuminated by the scanning transmitted beam 26. Therefore, the scene formed by the receiver collecting lens 18 must be scanned across the detector cell 19 by exactly the right amount to keep the image of the moving illuminated spot or target centered on the detector cell. To achieve this degree of synchronism, the present invention makes use of the scan mirror 20 which is silvered on both faces for use by the transmitter 10 and receiver 11. Thus, the common scan mirror 20 produces identical movements of the rays in the transmitting and receiving portions of the optical system. Because the projecting lens 16 and the receiver collecting lens 18 have different focal lengths, the necessary condition for synchronism is that:

$$\frac{r}{f_R} = \frac{f_1}{f_p}$$

where:

$r$=distance of receiver image plane from scan mirror 20.

In practice, the distance $r$ is varied systematically until synchronism is achieved.

Referring now to the scan mirror drive assembly illustrated in FIGS. 1 and 3, a lever member 27 is operatively connected to mirror 20 and pivotally mounted at 28 on the housing 29 of the optical system. Lever 27 is spring biased in one direction by spring 30 and in the opposed direction by cam follower 31 driven by cam 32 which in turn is driven by a prime mover or motor 33 via a gear train indicated generally at 34, the gear train 34 being mounted in a support member 35. The motor 33 may be electric or other suitable type.

A potentiometer 36 is also driven through gear train 34 and functions to determine the angular position (phase) of the cam 32 and thus providing a means whereby the target location can be read out electrically at the instant the target is registered by the detector cell or cells 19.

Housing 29 is provided with a pair of slots 37 which permits the drive assembly for lever 27 to be moved toward or away from the scan mirror 20 whereby the scan mirror 20 can be moved through different scan angles to enlarge or decrease the field scanned due to the cam follower action on different effective lever arm lengths of lever 27. Screws or other attaching means indicated at 38 serve to hold the support housing 35 of the drive assembly fixed in slots 37.

It is thus seen that the present invention provides a laser radar having an optical system which utilizes a single scanning mirror to insure synchronism between the transmitter and receiver functions. Also, the novel use of the cylindrical lens to form a beam having a rectangular cross section thereby provides an advance over the prior known systems.

Although a rectangular beam cross section is utilized herein, the scan synchronizing technique is equally applicable to other beam shapes such as multiple fan beams or V-beams, however the forming optics for such beams would be different.

By substituting an eyepiece and a human observer in place of the detector cell, the system could be used for visual scanning with illumination. This approach could be useful in directing a searchlight beam against an aircraft, due to the observer's eye remaining fixed during the scanning.

Although a particular embodiment utilizing the invention has been illustrated and described, modifications will become apparent to those skilled in the art, and it is intended to cover in the appended claims all such modifications as come within the true spirit and scope of the invention.

What we claim is:

1. A laser radar comprising, in combination, a laser unit, synchronized transmitting and receiving optics, and detecting means, said laser unit being operably disposed to transmit a laser beam to an associated target via said transmitting optics; said receiving optics being operably disposed to receive a laser beam reflected from said associated target and to direct said reflected beam to said detecting means; said transmitting and receiving optics including a dual sided mirror-like scanning means operably disposed between said transmitting optics and said receiving optics for synchronizing said receiving optics with said transmitting optics; and means operably connected to said scanning means for moving said scanning means; said transmitting optics additionally including an adjustable mirror, a first lens operably disposed between said scanning means and said adjustable mirror for directing said laser beam onto said adjustable mirror for reflection therefrom, a second lens operably disposed to receive said reflected laser beam from said adjustable mirror, said second lens causing the rays of said reflected laser beam to diverge to a substantially parallel pattern, and a third lens operably located adjacent said second lens to receive said substantially parallel rays of said reflected laser beam and to broaden said beam in a long dimension; said scanning means being pivotally mounted for reflecting said laser beam onto said first lens while simultaneously reflecting the received beam onto said detecting means; the rotation of said scanning means causing corresponding changes in the direction of the respective beams reflected from said scanning means.

2. The laser radar defined in claim 1, wherein said receiving optics additionally includes a lens for collecting the beam rays reflected from said associated target and focusing the rays toward the detecting means via said scanning means.

3. The laser radar defined in claim 2, wherein said dual sided scanning means consists of a plane mirror silvered on both faces which thus produces identical movements of the rays being transmitted and received.

4. The laser radar defined in claim 3, wherein said means for moving said scanning means includes a prime mover, gear means drivingly connected to said prime mover for movement by said prime mover, a cam operatively connected to said gear means and responsive to the movement of said gear means, a cam follower operably disposed relative to said cam and responsive to movements of said cam, a lever operatively connected to said scanning means and to said cam follower, said cam follower biasing said lever in one direction to move said scanning means, and bias means operatively connected to said lever and responsive to movements of said cam and cam follower for biasing said lever in a direction opposed to that of said cam follower.

5. The laser radar defined in claim 4, wherein a potentiometer is drivingly connected to said gear means.

6. The laser radar defined in claim 5, additionally including means operably connected to said detecting means for adjustably positioning said detecting means.

7. An optical system comprising: a source of light, transmitting optics from transmitting light from said source to a target, receiving optics for receiving light returned from said target, and means operably disposed, between said transmitting optics and said receiving optics for synchronizing said receiving optics with said transmitting optics; said synchronizing means comprising a pivotally mounted dual sided mirror-like means, and means operably connected to said mirror-like means for oscillating said mirror-like means; said transmitting optics comprising an adjustable mirror, a first lens operably disposed between said dual sided mirror-like means and said adjustable mirror, a second lens, said adjustable mirror operably positioned between said first and second lenses, and a third lens located on the side of said second lens opposite said ajustable mirror; said pivotally mounted mirror-like means reflecting the light from said source onto said first lens while simultaneously reflecting the returned light onto detecting means; the oscillation of said mirror-like means causing corresponding changes in the direction of the respective beams reflected from said mirror-like means.

8. The optical system defined in claim 7, wherein said receiving optics includes a collecting lens.

9. The optical system defined in claim 8, wherein said means for oscillating said dual sided mirror-like means includes a lever means operatively connected to said mirror-like means, biasing means operatively connected on one side of said lever means for biasing said lever means in one direction, and means operatively connected on the side of said lever means opposite said biasing means for driving said lever means against said biasing means.

10. The optical system defined in claim 9, wherein said driving means includes a cam and cam follower.

11. The optical system defined in claim 10, wherein said cam and cam follower are driven by a prime mover via gear means operatively connected to said prime mover and to said cam and cam follower for driving said cam and cam follower.

12. The optical system defined in claim 11, additionally including means driven by said oscillating means for determining the angular position or phase angle of said cam.

References Cited

UNITED STATES PATENTS

| | | | |
|---|---|---|---|
| 3,364,358 | 1/1968 | Answorth | 250—219 |
| 2,750,836 | 6/1956 | Fastie. | |
| 3,278,753 | 10/1966 | Pitts et al. | |
| 3,293,438 | 12/1966 | Davis. | |

FOREIGN PATENTS 992,760   5/1965   Great Britain.

RONALD L. WIBERT, Primary Examiner

F. L. EVANS, Assistant Examiner

U.S. Cl. X.R.

350—6, 289, 300